Figure 1:
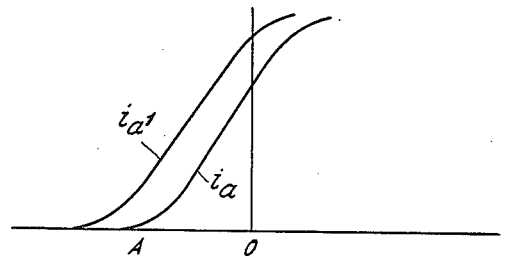

Aug. 10, 1937. C. J. DE L. DE LA SABLONIÈRE 2,089,785
TRANSMITTER
Filed Nov. 16, 1932 2 Sheets-Sheet 1

INVENTOR
CHRISTIAAN JAN DE LUSSANET DE LA SABLONIÈRE
BY
ATTORNEY

Aug. 10, 1937.   C. J. DE L. DE LA SABLONIÈRE   2,089,785
TRANSMITTER
Filed Nov. 16, 1932    2 Sheets-Sheet 2
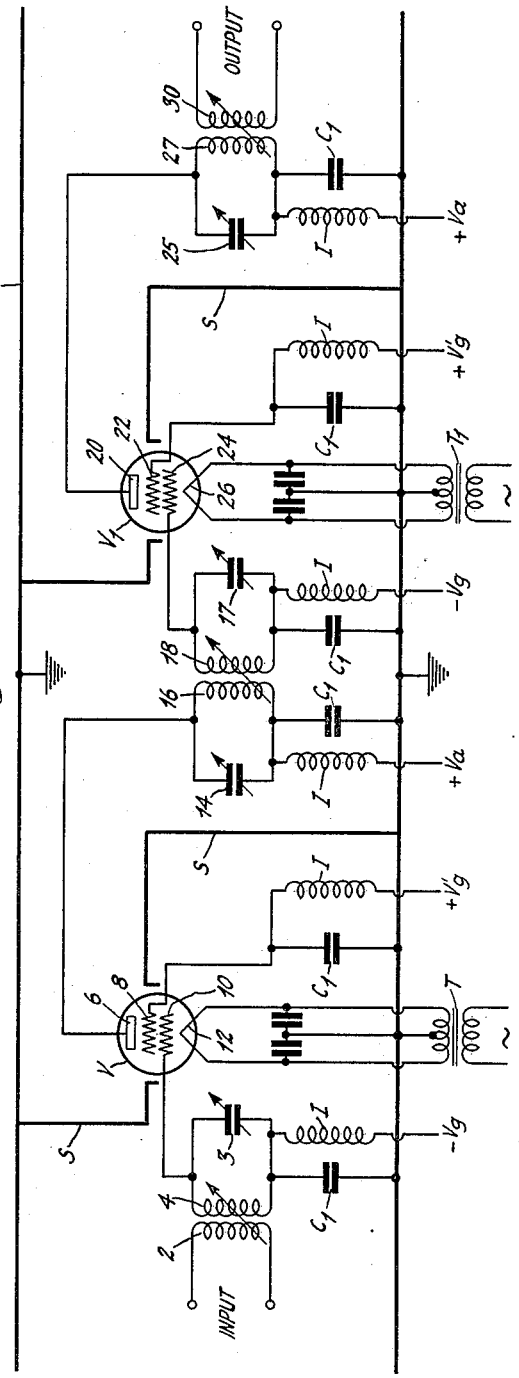
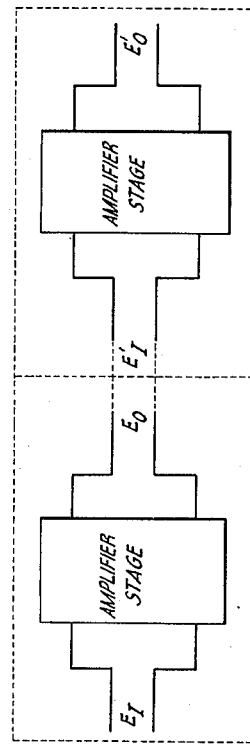
INVENTOR
CHRISTIAAN JAN DE LUSSANET DE LA SABLONIÈRE
BY
ATTORNEY Patented Aug. 10, 1937

2,089,785

UNITED STATES PATENT OFFICE

2,089,785

TRANSMITTER

Christiaan Jan de Lussanet de la Sablonière, Eindhoven, Netherlands, assignor to Radio Corporation of America, a corporation of Delaware Application November 16, 1932, Serial No. 642,983
In the Netherlands December 10, 1931

4 Claims. (Cl. 179—171)

This invention relates to a transmitter in which screening grid tubes are used and in which, in accordance with the invention, the tubes are connected in such a manner that the amplification of each stage is materially larger than with the transmitters hitherto used.

Thereby the advantage is obtained that the number of amplification stages required for yielding a definite final power is appreciably smaller than that hitherto required.

In order to obtain a final power of 50 kilowatts 5 to 6 stages were required formerly, whereas with the transmitter according to the invention this final power may be readily attained by means of three stages.

According to the invention this may be realized by connecting and by biasing the tubes in such a manner that grid currents are avoided as much as possible.

Hitherto it was always sought when building transmitters to cause each tube to feed as much energy as possible to the circuit connected with the anode of the tube, so that each tube transferred as much energy as possible to the grid circuit of the succeeding tube.

For this purpose it is required that the anode current of each tube reaches the saturation value in each period.

This can be obtained only if the maximum grid potential is strongly positive so that the occurrence of grid currents is unavoidable.

Under these circumstances a fairly large energy must be supplied to the grid of the tube in order that it gives the maximum energy, the amplification per stage being small so that a large number of stages was required for a fairly large power.

It might have been possible, it is true, to increase the energy amplification by operating the tubes in such a manner that the grid currents remain small, but this was never resorted to because in this case the tubes deliver only a small part of the energy which they might supply at full load, so that for obtaining a definite final power much larger tubes would be required than is necessary. Since, moreover, these tubes must be operated at higher tensions than a fully loaded smaller tube the price of the whole installation is higher than that of an installation in which the tubes are fully loaded.

The underlying advantage of the present invention is that when using screening grid tubes it is possible to amplify very strongly without the efficiency of the tube, i. e., the ratio between the high frequency energy and the energy supplied by the source of anode current becoming unsatisfactorily low.

According to the invention the attainable amplification per stage may be increased by taking measures for increasing the grid bias required for cut-off.

This may be effected:

1. By using a tube in which the amplification factor, measured with the screen grid connected to the anode, is small;

2. By using a screen grid potential which is as large as possible. If need be, additional means may be resorted to for counteracting the action exerted by the secondary emission of the anode.

The invention may be more clearly understood by reference to the accompanying drawings, representing in Figure 1 by way of example, a characteristic curve of a screening grid tube indicating the relation between the anode current and the control grid voltage, and in Figures 2, 3, 4, and 5 circuit arrangements whereby the principles of the present invention may be carried out.

The grid cut-off bias is determined by the distance O A, Figure 1, in which A denotes the point at which the curve $i_a$ touches the horizontal axis.

In accordance with a known formula the total current supplied by the cathode is:

$$i_c = k(gg'v_g + g'v_g' + v_a)^{3/2}$$

in which $v_g$ denotes the control grid voltage, $v_g'$ the screen grid voltage; $v_a$ the anode voltage; $g$ practically denotes the amplification factor of the tube with anode connected with screen grid; and, $gg'$ denotes the total amplification factor.

The grid space $v_{go}$ is determined by the relation:

$$gg'v_{go} + g'v_g' + v_a = 0,$$

or, since $$g'v_g' \gg v_a$$

$$v_{go} = -\frac{v_g'}{g}$$

Consequently a high screen grid voltage $v_g'$ and a low amplification factor $g$ will contribute to an increase of the grid cut-off bias.

The amplification factor $g$ may be kept small by a proper construction of the tube. The measures to be taken for this purpose are known and need not be set out.

In order to use a large screen grid voltage it is advisable to use a tube in which the secondary emission of the anode is limited as much as possible.

To this end a special grid may be mounted between the screen grid and the anode, said grid preventing secondary electrons coming from the anode from reaching the screen grid. It is also possible to make the anode of a poorly emitting material or to coat it therewith.

Finally, in order to use a strong amplification, measures must be taken to eliminate as much as possible the mutual reaction of the amplification stages. These measures as for instance screening are known per se and are generally taken with transmitters. If, however, extremely strong amplification is used then the risk of instability due to the reaction of one stage on a preceding stage is much greater so that also the screening must satisfy much higher conditions. According to the invention the outer screening may merge into the inner screening formed by the screen grid.

By using a large screen grid voltage the characteristic curve of the tube is appreciably displaced to the left so that at a grid voltage at which no grid currents are set up the anode current approaches to the saturation value.

This appears from both characteristic curves $i_a$ and $i_{a1}$ shown in the drawings, in which $i_{a1}$ corresponds to a larger screen grid voltage than $i_a$. In these conditions a large energy is supplied by the tube at a very small amount of energy fed to the control grid.

In these circumstances the efficiency of the tube is satisfactory. Practical experiments proved that an efficiency of 60 percent is readily attainable, which value is not appreciably inferior to that of triodes carrying strong grid currents. The advantage obtained by the invention is that the total efficiency of the installation is large. By "total efficiency" is to be understood the ratio between the useful (emitted) energy and the total amount of energy supplied to the system. In addition the total price of the installation is smaller, it being possible to build a transmitter having a comparatively large power (20–40 kilowatts) comprising one or more water cooled tubes in the last stage only.

In fact, the final stage may be controlled by a tube having a power of about 500 watts which may be readily constructed without water cooling. The power required in the penultimate stage may be further reduced by rendering the grid bias not extremely high. In that case grid currents will occur in the valve of the next to the last stage so that the anode currents in the region of saturation will be decreased by an amount which is governed by the decrease of the grid currents. Thus the supply of energy to the final stage is reduced so that the efficiency of the final valve decreases. However, by reason of the lower grid voltage at the next to the last stage the anode voltage of that stage may be lower so that the power of the valve at this stage may be smaller. The loss in efficiency of the final stage exercises less influence than the profit obtained at the next to the last stage. To the proper value of the negative bias of the final stage no general condition can be stated but in each separate case the most favorable value may be readily determined. The influence exerted by the grid currents on the attainable amplification appears best from the following values, obtained by using a tube having a power (anode dissipation) of approximately 400 watts, the wave length being 135 meters.

| Anode voltage | Screen grid voltage | Total energy fed from the anode battery | Grid current | Antenna energy | Amplification =antenna energy F divided by high frequency energy supplied by preceding valve |
|---|---|---|---|---|---|
| | | Watts | | Watts | |
| 4500 | 2150 | 645 | 0 | 220 | 2450 |
| 4500 | 1870 | 700 | 2 mA | 315 | 485 |
| 4500 | 1280 | 875 | 8.2 mA | 480 | 111 |
| 4500 | 1090 | 990 | 12.8 mA | 600 | 76 |

From this table, which relates to measurements for which no particular high voltages were used so that the efficiency is not very large, it appears how the amplification decreases with an increase of the grid currents. When using the invention the tube must be slightly larger for a definite output energy than is necessary at full load. However, the advantages obtained by the invention amply make good this drawback. With the first series of tests an amplification value 2500 and an efficiency of approximately 35 percent is found. This efficiency is comparatively small, but may be appreciably increased by using higher anode voltages. With the second series, amplification is about 500. In this case the 315 watts of output energy is consequently obtained by means of 0.76 watt high frequency energy from the preceding stage, whereas in the first mentioned case 220 watts required only 0.09 watt, which energy may be readily supplied by a crystal stage. By means of the 220 watts of energy fed from the anode circuit of the tube by means of which the measurements have been made, the use of the invention allows readily of controlling an output energy of the order of magnitude of 20 kilowatts or more, so that such a transmitter, in accordance with the invention, need not comprise more than three stages owing to which an extraordinary simplification of the whole installation is realized.

The principles of the present invention, whereby increased amplification with a reduced number of tubes may be obtained, may be carried out on various circuits. For purposes of illustration only applicant has shown several circuit arrangements by means of which the principles of the present invention may be carried out.

Figure 2:
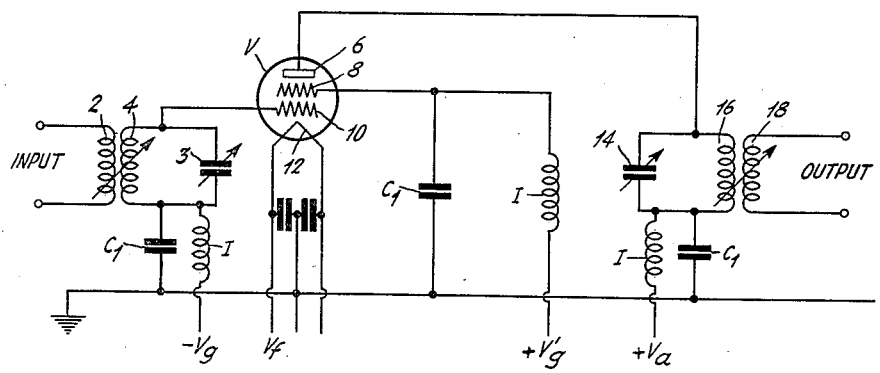

In Figure 2 the oscillations to be amplified may be impressed on the winding 2 and from the winding 2 to the inductance 4 and thence to the grid electrode 10 of the amplifier V. The repeated and amplified oscillations appear on the anode 6 and are impressed from the anode 6 to the circuit including the inductance 16 and thence to any output circuit connected to inductance 18. The input circuit may be tuned to the frequency of the oscillations amplified by the capacity 3 while the output circuit may be tuned to the desired frequency by the capacity 14. The potentials necessary to charge the grid to the desired potential may be impressed by way of a charging inductance I from a negative source connected at $V_g$. The high potentials necessary to energize the anode 6 may be applied by way of a second choking inductance I from a source connected at $V_a$. Radio frequency oscillations may be shunted around both of these charging inductances by way of capacity C₁ connected as shown to the filament 12. The shielding grid 8 may be charged from a source V'g by way of an additional choking inductance I shunted by a third by-passing condenser C₁.

Figure 3:
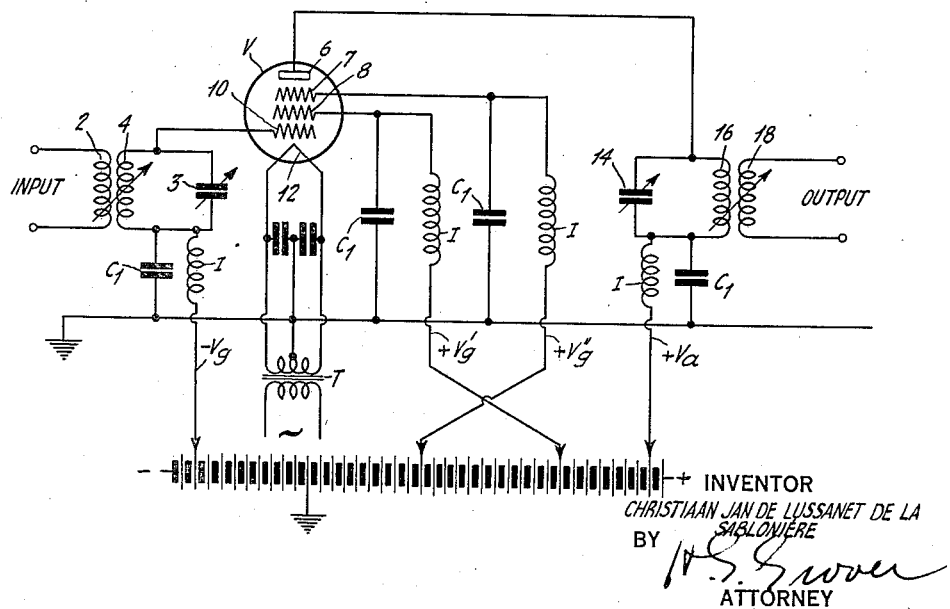

As pointed out in detail hereinbefore, by maintaining the control grid at the proper high negative potential and applying the high anode potentials, an inordinately large amount of amplification may be obtained in the tube V so that when the tube V is included in an amplifier the number of thermionic tubes therein may be reduced. Of course, a single battery or several batteries may be utilized to energize the tube V without departing from the spirit of the present invention. For example, a single source may be used, as shown in Figure 3, which, except as otherwise noted hereinafter, is similar to that shown in Figure 2. Furthermore, the current for the cathode 12 may be supplied from a direct current source or from an alternating current source as shown in Figures 2 and 5.

In order to prevent secondary emission from the anode from reaching the screen grid, the anode may be made of poor emitting material or an additional electrode 7 may be interposed between the anode and the screen grid, as shown in Figure 3, and charged by way of an additional charging inductance I from the common source.

In applicant's arrangement great amounts of amplification are obtained. The shielding between stages and between circuits of stages therefore must be complete. Each stage should be enclosed in a conductive shield, as indicated in Figure 4, in which oscillations to be amplified are represented by E₁ and applied to the first amplifier stage and the output E₀ of said stage applied to an additional amplifier stage shielded from the first stage.

In Figure 5 several stages as illustrated in Figure 2 are shown connected in cascade. These stages are shielded, as shown, by conducting material S. Preferably portions or partitions of S are, as shown, in effect, extensions of the screening grid 8 interposed between the anode 6 and control grid 10 so that the input and output electrodes and circuits of each stage are shielded internally of the tube by the screen grid electrode and externally thereof by the shield S, which is, in effect, an extension of said electrode.

Having thus described my invention and the operation thereof, what I claim is:

1. Signalling means comprising, a discharge tube having a control grid electrode, an anode, a cathode, and a screen grid electrode, means for applying alternating current to the control grid electrode to be amplified, means for applying positive potential between the anode and cathode of said tube, an output circuit connnected with the anode of said tube, means applying a negative potential between the cathode and control electrode means for applying a positive potential between the screen grid and cathode sufficiently high to cause maximum permissible anode current to flow in said anode circuit before current of appreciable intensity flows in said control grid circuit, and means for preventing reaction between said anode and screen grid comprising an auxiliary electrode between said anode and screen grid electrode.

2. An arrangement as claimed in claim 1 in which several stages are connected in cascade and in which the stages are shielded from each other.

3. The method of operating a thermionic tube of the screen grid electrode type to amplify varying potentials which includes the steps of, applying said potentials to be amplified between the control grid and cathode of said tube, maintaining the anode of said tube at a positive potential relative to the cathode of said tube, maintaining the control grid of said tube at a negative potential relative to the cathode of said tube more than sufficient to cut off anode current in the absence of control grid excitation, said negative potential being such that no control grid current flows during operation of said tube, and maintaining the screen grid of said tube at a positive potential relative to the cathode sufficient to produce anode current saturation of said tube without the control grid of said tube becoming more positive than the cathode of said tube.

4. The method of operating a thermionic tube of the pentode type to amplify varying potentials which includes the steps of, applying said potentials to be amplified between the control grid and cathode of said tube, maintaining the anode of said tube at a positive potential relative to the cathode of said tube, maintaining the control grid of said tube at a negative potential relative to the cathode of said tube more than sufficient to cut off anode current in said tube in the absence of control grid excitation, said negative potential being such that no control grid current flows during operation of said tube, maintaining the screen grid of said tube at a positive potential relative to the cathode sufficient to produce anode current saturation of said tube without the control grid of said tube becoming more positive than the cathode of said tube, and maintaining the suppressor grid electrode at a potential relative to said cathode sufficient to prevent material emission from the anode.

CHRISTIAAN JAN DE LUSSANET
DE LA SABLONIÈRE.